No. 820,866. PATENTED MAY 15, 1906.
J. W. HARRIS.
COMBINED PIPE CLAMP AND WRENCH.
APPLICATION FILED SEPT. 21, 1905.
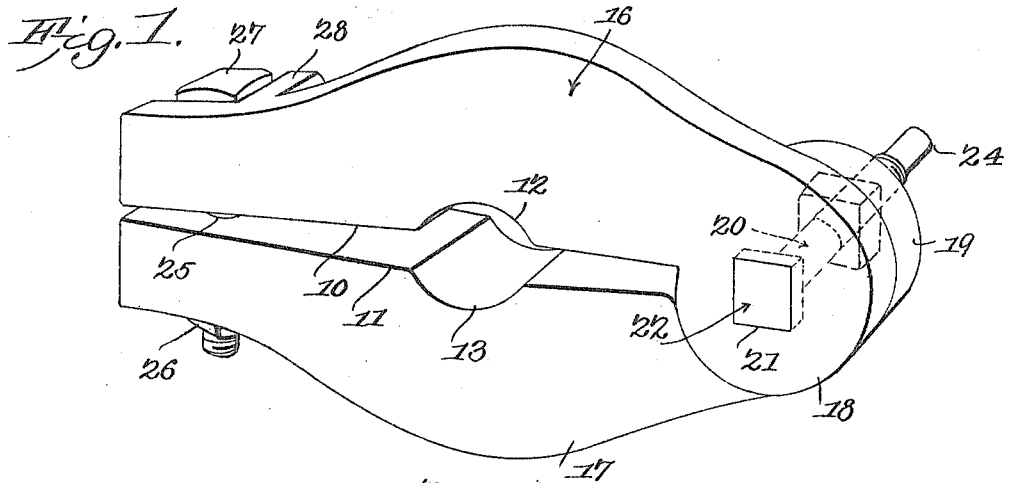
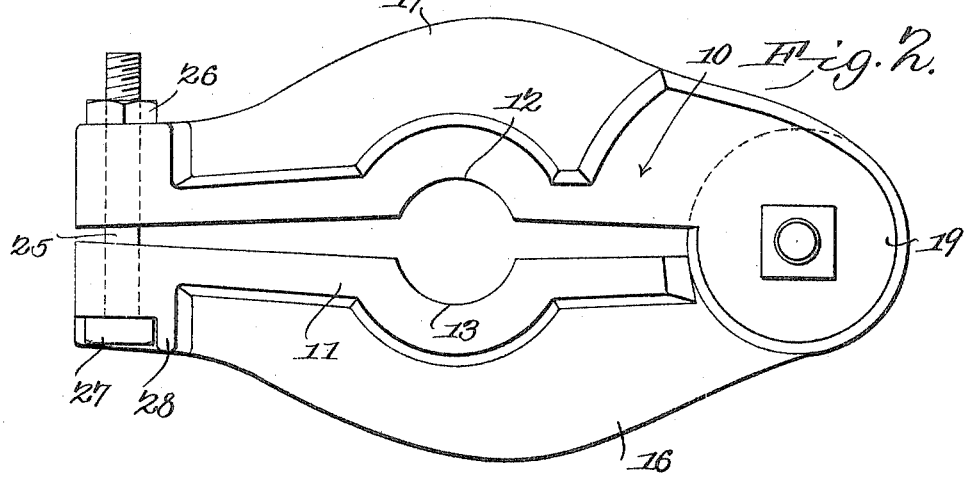
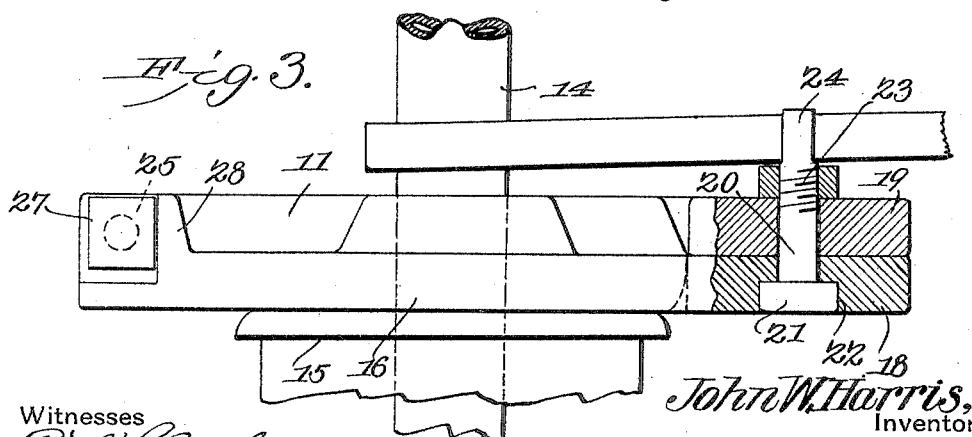

UNITED STATES PATENT OFFICE.

JOHN WESLEY HARRIS, OF PEARSALL, TEXAS.

COMBINED PIPE CLAMP AND WRENCH.

No. 820,866.          Specification of Letters Patent.          Patented May 15, 1906.

Application filed September 21, 1905. Serial No. 279,488.

*To all whom it may concern:*

Be it known that I, JOHN WESLEY HARRIS, a citizen of the United States, residing at Pearsall, in the county of Frio and State of Texas, have invented a new and useful Pipe Clamp and Wrench, of which the following is a specification.

This invention relates to improvements in combined pipe clamps and wrenches, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of embodiment of the invention, capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a perspective view from beneath of the improved device, and Fig. 2 is a plan view. Fig. 3 is a side elevation of the device applied.

The improved device comprises two body members 10 11, having recesses 12 13 in their contiguous edges for bearing upon opposite sides of the pipe to be clamped, the latter indicated at 14 in Fig. 3.

The device herein shown and described is designed for use more particularly for supporting the suction-pipes in wells of various kinds, such as tubular or Artesian wells, wherein a tubular curbing is employed, and a portion of such a curbing is represented at 15 in Fig. 3, with the body members 10 11 clamped upon the pump-tube 14 and bearing upon the upper end of the curbing, and thus supporting the tubing suspended within the curbing.

To increase the efficiency of the device and extend the bearing-surface, the members 10 11 are formed, respectively, with lateral ribs 16 17 with their lower faces flush with the lower faces of the members 10 11, as shown. By this means a relatively broad bearing-surface is presented to the upper edge of the curbing, which materially increases the utility and efficiency of the device and distributes the strains over a wider area, while at the same time securing a uniform pressure upon all parts of the curbing and also of the clamping members.

At one end the members 10 11 are formed with overlapping ears 18 19, through which a pivot-pin 20 passes, the pivot-pin having a head 21 at one end preferably bearing in a recess 22 in the ear 18.

The pin 20 is provided with a portion threaded intermediate its length, as at 23, to receive a nut 24, bearing upon the face of the ear portion 19, thus leaving a portion of the pin unthreaded and extending beyond the bearing-nut, as at 24.

At their opposite ends the members 10 11 are coupled by a clamp-bolt 25 and its nut 26 and operating at right angles to the pivot 20, so that the operation of the nut 26 will firmly clamp the members 10 11 upon the tubing.

The head portion 27 of the bolt 25 is held from rotation by a rib 28, extending from the member 11, as shown.

It frequently happens that the tubing 14 is to be wholly or partly rotated while bearing upon the curbing 15, and when this occurs the extension portion 24 of the pivot-pin 20 is employed to serve as a fulcrum or rest for a wrench lever or bar 29, which is disposed with one end, as 30, against the tube or pipe 14 and with the intermediate portion bearing against the unthreaded portion 24 of the pivot-pin. By this simple means a very strong leverage power is exerted upon the pipe to rotate it.

Having thus described the invention, what is claimed is—

1. A tubing-clamp consisting of two body members having recesses in their contiguous edges for bearing upon the tube from opposite sides and with laterally-extending ribs at the edges whereby a relatively broad bearing-surface is provided at one side, said members having overlapping ears at one end, a pivot-pin extending through said ears and with a head upon one end and threads disposed intermediately of the pin, whereby an unthreaded portion of the pin extends beyond the ears at one side to form a bearing for a wrench-arm, and a clamp-bolt operating through the opposite ends of the body members.

2. A tubing-clamp consisting of two body members having recesses in their contiguous edges for bearing upon the tube from opposite sides and with overlapping ears at one end, a clamp-bolt operating through said body members at one end, and a pivot-pin disposed through said overlapping ears and with a head at one end and with threads intermediately of the pin and a clamp-nut engaging said threaded portion, whereby an unthreaded portion of the bolt is provided and extending beyond the clamp-nut.

In testimony that I claim the foregoing as my own I have hereto affixed my signature in the presence of two witnesses.

JOHN WESLEY HARRIS.

Witnesses:
FRED G. SMITH,
L. H. SMITH.